United States Patent [19]

Lin

[11] Patent Number: 5,002,295

[45] Date of Patent: Mar. 26, 1991

[54] UNICYCLE HAVING AN ECCENTRIC WHEEL

[75] Inventor: Fuh T. Lin, Chang Hua Hsien, Taiwan

[73] Assignee: Pro-China Sporting Goods Industries Inc., Taiwan

[21] Appl. No.: 512,663

[22] Filed: Apr. 19, 1990

[51] Int. Cl.⁵ ............................................... B62K 1/00
[52] U.S. Cl. ..................................... 280/205; 280/229
[58] Field of Search ................................. 280/205, 229

[56] References Cited

U.S. PATENT DOCUMENTS 3,083,036  3/1963  Cornell, III et al. ............... 280/205
4,917,394  4/1990  Lin ........................................ 280/229

FOREIGN PATENT DOCUMENTS 286256  7/1915  Fed. Rep. of Germany ...... 280/229

Primary Examiner—Mitchell J. Hill
Attorney, Agent, or Firm—Dellett, Smith-Hill and Bedell

[57] ABSTRACT

A wheel of a unicycle has two beams disposed in parallel in a rim. A bolt is extended between the beams. The head of the bolt is disposed away from the geometric center of the wheel and the bolt extends through the geometric center of the wheel. Two plates which are connected together by a nut are slidably disposed between the beams. The bolt is engaged with the nut. An axle is extended outward from each plate. A rotation of the head of the bolt causes the axles to move either away or toward the geometric center of the wheel.

3 Claims, 4 Drawing Sheets

UNICYCLE HAVING AN ECCENTRIC WHEEL

BACKGROUND OF THE INVENTION

The present invention relates to a unicycle, and more particularly to a unicycle having an eccentric wheel.

Generally, a unicycle has a single wheel disposed below a frame fork. The axle and the geometric center of the wheel are concentric and fixed. The axle of the wheel can not be adjusted or separated from the geometric center of the wheel.

A bicycle which has an eccentric rear wheel is disclosed in the patent application, filed Apr. 28, 1989, by the applicant, Ser. No. 07/344,694, which was allowed on Nov. 21, 1989, and issued on Apr. 17, 1990 as U.S. Pat. No. 4,917,394. That invention is developed for two wheel bicycles.

SUMMARY OF THE INVENTION

The primary objective of the present invention is to provide a unicycle having an eccentric wheel, in which the axle of the wheel can be adjusted eccentrically relative to a geometric center thereof.

In accordance with one aspect of the invention, there is provided a unicycle which includes a seat provided on an upper end of a frame fork, and a pair of foot pedals provided on a lower end of the frame fork. A wheel has two beams disposed in parallel in a rim. The beams are symmetric about a geometric center of the wheel. A bolt which has a head formed on one end is extended between the beams. The head of the bolt is disposed away from the geometric center of the wheel and the bolt extends through the geometric center of the wheel. Two plates which are connected together by a nut are slidably disposed between the beams. The bolt is engaged with the nut. An axle is extended outward from each plate. The axles are rotatably supported in the lower ends of the frame fork and the foot pedals are coupled to a free end of the axles. A rotation of the head of the bolt causes the axles to move either away or toward the geometric center of the wheel.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
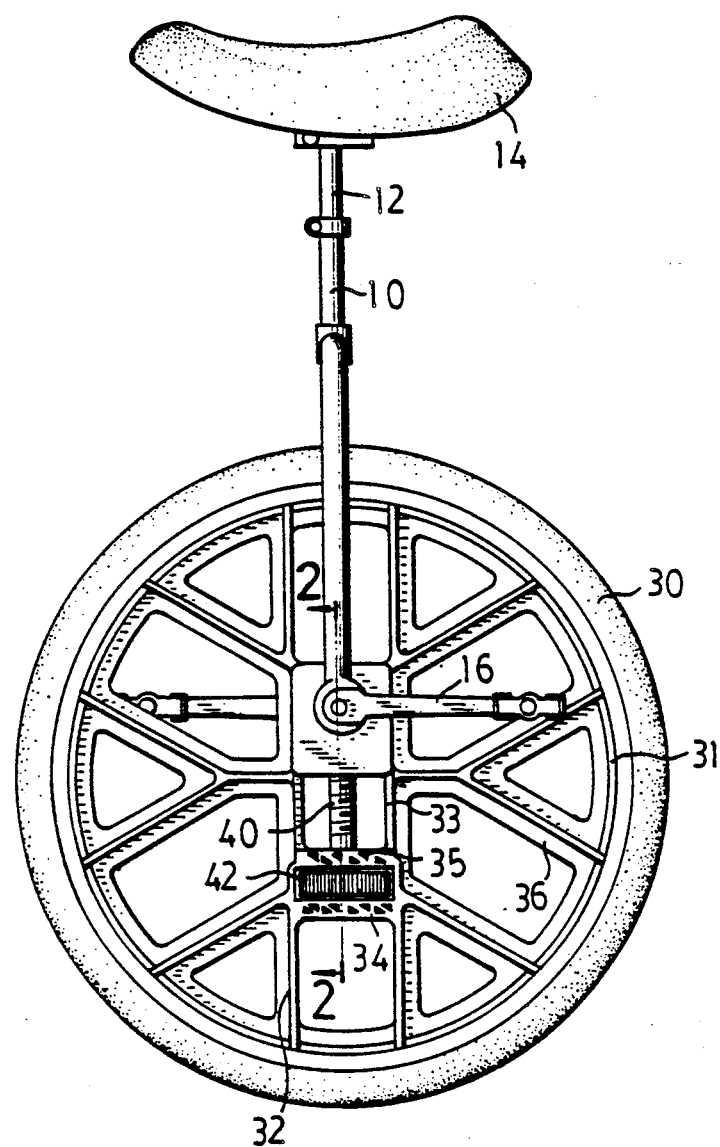
FIG. 1 is a plane view of a unicycle in accordance with the present invention.
Figure 2:
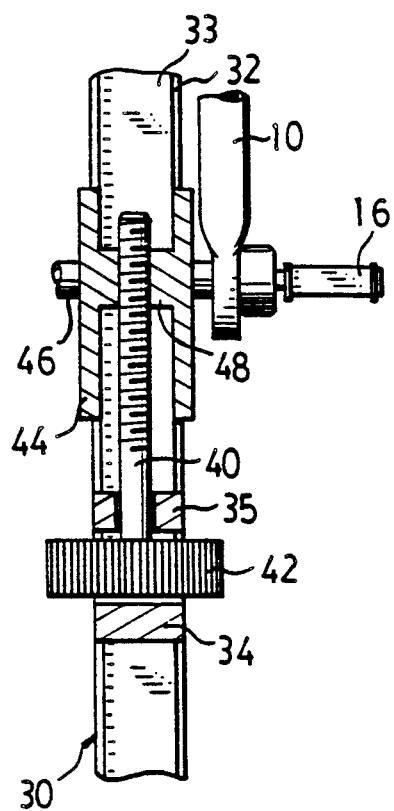
FIG. 2 is a partial cross sectional view of the unicycle.

Referring to the drawings and initially to FIGS. 1 and 2, the unicycle in accordance with the present invention comprises generally a frame fork 10, a seat post 12 and a seat 14 being disposed upon the frame fork 10, a wheel 30 and a pair of foot pedals 16 rotatably provided on a lower end of the frame fork.

The wheel 30 is disposed around a rim 31. Two parallel beams 32 are disposed in the rim 31 and are symmetric about a line which passes through the geometric center of the wheel 30. A rib 33 is longitudinally formed on an inner surface of each beam 32. The ribs 33 are narrower than the beams 32 so as to form a shoulder therebetween, best shown in FIG. 2. Two cross bars 34, 35 are provided in parallel between the two beams 32 for receiving a head portion 42 of a bolt 40 therebetween. The cross bars 34, 35 and the head portion 42 of the bolt 40 are preferably halfway between the rim 31 and the geometric center of the wheel 30. The bolt 40 extends toward and through a center of the geometric center of the wheel 30. A plurality of spokes 36 are integrally formed in the rim 31.

Two guide plates 44 which are integrally fixed together by a nut 48 are slidably disposed between the beams 32. An axle 46 extends outward from each guide plate 44. The lower ends of the frame fork 10 are rotatably coupled to the axles 46. The end portions of the guide plates 44 slidably contact the ribs 33 and are slidably engaged in the shoulders between the ribs 33 and the beams 32 so that the guide plates 44 are limited to move longitudinally along the beams 32. The bolt 40 is threadedly engaged with the nut 48. A rotation of the bolt head 42 causes the nut 48 and the plates 44 to move longitudinally along the beams 32 so that the axles 46 are caused to move either away or toward the geometric center of the wheel 30. The movable distance of the axles 46 relative to the geometric center of the wheel 30 is preferably limited to a quarter of the diameter of the rim 31.

Figure 3:
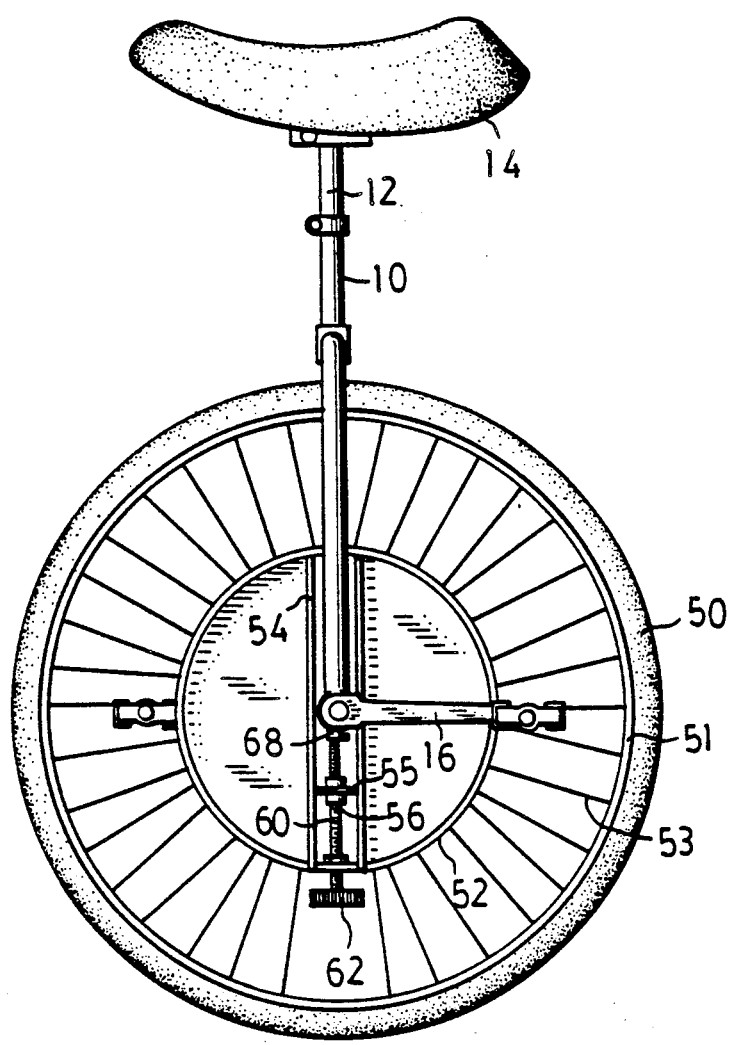
FIG. 3 is a plane view similar to FIG. 1, illustrating another embodiment of the present invention.
Figure 4:
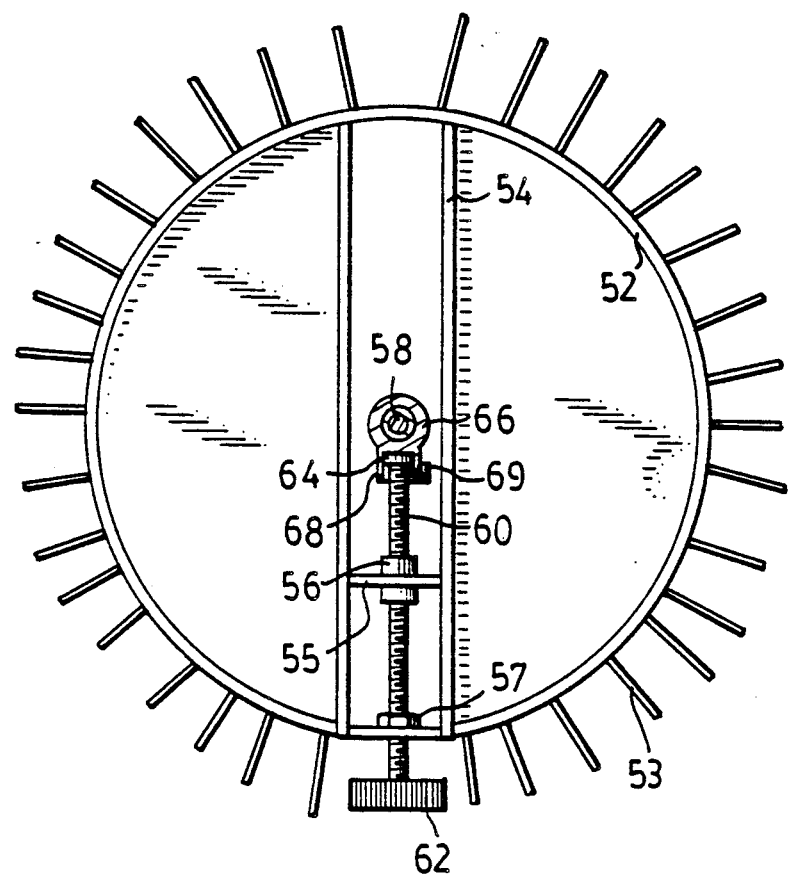
FIG. 4 is an enlarged plane view of the inner rim portion of the wheel of FIG. 3.

Referring next to FIGS. 3 and 4, illustrated is another embodiment of the present invention. A wheel 50 is rotatably supported on a lower end of the frame fork 10. An outer rim 51 and an inner rim 52 which are coupled together by a plurality of spokes 53 are disposed in the wheel 50. Two beams 54 are disposed in parallel in the inner rim 52. A cross bar 55 with a nut 56 or the like is fixed between the two beams 54 and is about halfway between the inner rim 52 and the geometric center of the wheel 50. A bolt 60 which has a head 62 formed on one end and an enlarged end portion 64 formed on another end thereof is threadedly engaged with the inner rim 52 and the nut 56. A lock nut 57 is provided beside the inner rim 52 for locking the bolt 60 in position. A sleeve 66 with a short tube 68 is fixed to the axle 58 of the wheel 50. The enlarged end portion 64 of the bolt 60 is rotatably received in the short tube 68 and is limited to rotate in the short tube 68 by a screw or lock bolt 69. A rotation of the head 62 of the bolt 60 causes the bolt 60 to move along the channel between the beams 54 so that the axle 58 of the wheel 50 is caused to move radially away or toward the geometric center of the wheel 50. The movable distance of the axle 58 relative to the geometric center of the wheel 50 is preferably limited to a quarter of the diameter of the inner rim 52.

Accordingly, the unicycle in accordance with the present invention has a wheel 30, 50 whose axle 46, 58 is movable away from the geometric center of the wheel 30, 50 so that the user may simulate horseback running.

Although this invention has been described with a certain degree of particularity, it is to be understood that the present disclosure has been made by way of example only and that numerous charges in the detailed construction and the combination and arrangement of parts may be restored to without departing from the spirit and scope of the invention as hereinafter claimed.

I claim:

1. A unicycle comprising a seat provided on an upper end of a frame fork, and a pair of foot pedals provided on a lower end of said frame fork; a wheel having two beams disposed in parallel in a rim thereof, said beams being substantially symmetric about a geometric center of said wheel, two cross bars being fixed between said beams for rotatably receiving a head of a bolt, said head of said bolt and said cross bars being disposed away from said geometric center of said wheel, said bolt extending toward said geometric center of said wheel, two plates which are connected together by a nut being slidably disposed between and along said beams, said bolt being engaged with said nut, an axle being extended outward from each of said plates, said axles being rotatably supported in said lower ends of said frame fork and said foot pedals being coupled to a free end of said axles; and a rotation of said head of said bolt causing said plates and said axles to move either away or toward said geometric center of said wheel.

2. A unicycle according to claim 1, wherein a rib is longitudinally formed on an inner surface of each of said beams said rib is narrower than said beams so that a shoulder is formed on each side of said rib, an end portion of each of said plates is slidably received in said shoulder so that said plates are guided to move between and along said beams.

3. A unicycle comprising a seat provided on an upper end of a frame fork, and a pair of foot pedals provided on a lower end of said frame fork; a wheel having an outer rim and an inner rim provided therein, a plurality of spokes being disposed between said outer rim and said inner rim, a pair of beams being disposed in parallel in said inner rim, said beams being substantially symmetric about a geometric center of said wheel, a cross bar with a nut being disposed between said beams, a bolt being threadedly engaged with said inner rim and said nut; a lock nut being provided on said bolt beside said inner rim, said lock nut being rotated so as to move toward said inner rim for locking said bolt in place; said bolt having a head formed on one end and an enlarged end portion formed on an other end thereof, said head of said bolt being disposed away from said geometric center of said wheel; a sleeve with a short tube being coupled to an axle of said wheel, said enlarged end portion of said bolt being rotatably received in said short tube; and a rotation of said head of said bolt causing said axle of said wheel to move either away or toward said geometric center of said wheel.

* * * * *